May 23, 1933.　　　　C. H. COLVIN　　　　1,910,093
NAVIGATION CALCULATOR
Filed May 12, 1924　　　4 Sheets-Sheet 1

INVENTOR
Charles H. Colvin
BY
ATTORNEYS

May 23, 1933.  C. H. COLVIN  1,910,093
NAVIGATION CALCULATOR
Filed May 12, 1924  4 Sheets-Sheet 2

INVENTOR
Charles H. Colvin
BY
Bolkleer Ledbetter
ATTORNEYS

INVENTOR
Charles H. Colvin
BY
ATTORNEYS

May 23, 1933.          C. H. COLVIN          1,910,093
                    NAVIGATION CALCULATOR
              Filed May 12, 1924        4 Sheets-Sheet 4

INVENTOR
Charles H. Colvin
BY
ATTORNEYS

Patented May 23, 1933

1,910,093

UNITED STATES PATENT OFFICE

CHARLES H. COLVIN, OF BROOKLYN, NEW YORK, ASSIGNOR TO PIONEER INSTRUMENT COMPANY, INCORPORATED, OF BROOKLYN, NEW YORK, A CORPORATION OF NEW YORK

NAVIGATION CALCULATOR

Application filed May 12, 1924. Serial No. 712,533.

This invention relates to navigation instruments and more particularly to what I call a navigation calculator the principal use of which is in aerial navigation; and the main object is to provide an instrument capable of performing the many computations relating to air travel.

Navigation by means of dead reckoning consists in determining a new position from a consideration of the distance and direction of travel from an old known position. For the mariner this is very simple, requiring reference only to the log and the compass, with possibly a slight allowance for tide or currents, both of which are known and charted. In the air the problem is complicated by the fact that the medium in relation to which the aircraft is flying, the air, is itself moving in relation to the ground. To determine the travel of aircraft in relation to the ground, and hence to find its new position, the movement of the aircraft through the air must be added (vectorially) to the movement of the air over the ground.

The addition of vectors requires either a tedious trigonometric calculation or a graphic solution. Means for performing the latter are provided in my invention a general purpose of which is to enable the aerial navigator to properly chart and fly the desired course despite the handicap interposed by adverse air currents which, as they are highly variable and uncharted are as different from ocean currents as to render useless ordinary navigation facilities in aerial travel.

One of the main objects of the invention is to produce a rugged and durable instrument of simple construction capable of solving problems having to do with aerial navigation and thereby determining one or more of the seven following inter-related factors.

Air speed (velocity of the aircraft relative to the air).

Ground speed (velocity of the aircraft relative to the ground).

Heading (direction in which the aircraft is headed which is the compass reading assuming the compass is completely compensated).

Drift (angle between heading and course).

Course (direction in which the aircraft is traveling over the ground which is heading plus or minus drift).

Wind velocity.

Wind direction.

My invention provides means so arranged that any of the above factors which are known may be set into the instrument, and the remaining factors be determined.

As the seven factors are inter-related, certain of the unknown ones are solvable by setting the known and given factors into the instrument which then functions to produce a direct reading of the unknown factors. In some cases it is easier to determine certain factors than it is others, and a calculator must be adaptable so that any available factors may be used to determine the others. The problem resolves itself into the graphic solution of a triangle or of two simultaneous triangles, the lengths of the legs of which are equal to "air speed", "ground speed" and "wind velocity"; and the directions are accordingly the "heading", "course", and "wind direction," The seventh factor, "drift", appears in the triangle as the angle between the air speed and ground speed legs.

The problem which is generally considered most difficult to solve is the determination of ground speed from a craft flying over unfamiliar territory, and the altitude of which is unknown. These conditions render it impossible to determine ground speed by the usual method of timing direct ground observations, but in my invention ground speed can be worked out by making observations of air speed, heading and drift for two different headings approximately at 90 degrees to each other one of which is carried out by the navigator while on the intended course whereupon he immediately turns and flies along a course approximately rightangular to his original course and takes a similar observation thus giving two distinct observations as to the same factors, both of which are then set into the instrument which enables the navigator to determine the correct heading and ground speed for any course; and the craft then may be brought back to the original course or the corrected course.

The accompanying drawings illustrate one preferred embodiment of the invention serving to illustrate the construction, principle and mode of operation thereof. Certain changes may be made throughout without departing from the principle of the invention for the mechanism selected to demonstrate and explain my invention is exemplary only of one means of solving the many problems involved.

A general description will first be given of the face of the instrument with reference to the several indicating means, and referring now more particularly to the drawings, there is shown an instrument case or housing 10 containing the principal parts of the mechanism and which is closed from the back by a cover 11. A compass card or dial 12 is fixed upon, releasable from, and rotatable by a shaft 13 journaled in the housing and manually revolvable by means later described and the compass card is employed to read off or directly indicate the course and heading of the craft.

A scaled element W in the form of a graduated wind arm 14 carrying a reference pin or point 15 is slidably fixed to the shaft 13, and this wind arm may rotate in unison with the compass card in the operation of the instrument, but is held fixed on the shaft 13 and capable of hand adjustment to reset it relatively to the compass card by certain release means as hereinafter described. The wind arm 14 is adapted to be set in accordance with given wind data and to act as a reference index, by means of the point 15 thereof, in producing direct ground speed readings on a ground speed indicator arm which will now be described.

A ground speed scale G in the form of an arm 19 is fixed upon a compound motion shaft 20 and is adapted to undergo a rotary motion with reference to the shaft axis 20 and to undergo a longitudinal motion with the shaft axis 20, for as will be later understood this shaft is capable of both rotation and reciprocating motion lengthwise of the instrument casing 10. The shaft 20 together with its ground speed arm 19 is carried in a slide block 23 which reciprocates in a guide 24 made in the housing 10, and it is this scaled ground speed arm 19 which cooperates with the index pin 15 whereby said wind arm index 15 reads off true ground speed on the arm 19 which can be made good by the craft under given conditions.

An air speed index A in the nature of a pointer 25 is fastened to the slide 23 and moves longitudinally in the instrument housing along an air speed scale 26. A system of triangles 27 is ruled on a plate fastened to the instrument housing adjacent the air speed scale 26. The function of the triangles 27 and air speed scale 26 is to convert to "absolute air speed" the "indicated air speed" at the altitude at which the craft is flying.

The indicated air speed obtained from another instrument, i. e. from the aircrafts air speed indicator, is noted on the air speed scale 26 and is extended horizontally to the right until intersection is made with the vertical line corresponding to the altitude of the craft as observed for example on an altimeter. From this intersecting point, the appropriate oblique line is followed downwardly to the left back to the air speed scale 26, the point at which this scale 26 is reached, being the absolute air speed.

The necessity for this scale arises from the fact that an air speed indicator shows actual, or as it is termed, absolute air speed only at sea level. At higher elevations, an air speed indicator shows speeds which are less than actual speeds on account of the decrease in air density. For any indicated air speed taken from an air speed indicator, an amount must be added dependent upon altitude to give the actual or absolute air speed. The chart or scale 27 provides a graphical means of adding the proper amount to the indicated air speed to give the absolute air speed.

It is noted for example that from an indicated air speed of 100 on scale 26, a horizontal line extends out to the right. If the craft is flying at 10,000 feet, the horizontal line is followed until it intersects the vertical line 10. From this point of intersection with line 10, the oblique line is followed downwardly to the left where it points out absolute or actual air speed of 120 miles per hour on scale 26.

A drift scale 16 is fixed on the housing concentric with the compass card 12 and has a heading index or reference mark lubber's line 17 which cooperates with or points to the graduations or references on the compass card 12 to indicate directions. A combination course and drift index pointer 18 swings around the drift scale 16 with the shaft 13 as its pivot center, and this pointer 18 performs the double function of reading at one time against the compass card 12 to directly indicate course and reading against the drift scale 16 to directly indicate the value of the drift angle.

One practical form of mechanism for operating the several indicating means will be hereinafter described but for the present it should be understood that a knob 30 is employed to manually rotate the compass card 12 and wind arm 14 about the axis 13 in using the instrument for calculating purposes. In like manner a knob 31 is employed to reciprocate the slide block 23 back and forth in the guide 24 thereby causing the air speed index 25 and shaft 20 to travel longitudinally in the housing which imparts rectilinear motion to the graduated ground speed arm. Rotation or adjustment of the ground speed arm 19 around the axis of the shaft 20 is accomplished by the hand of the navigator who merely sets the said arm 19 to any angular position across the face of the compass card 12 which he may desire. As already mentioned, the movable course and index pointer 18 possesses two functions in that it points to the drift scale 16 to indicate drift, and points to the compass card 12 to indicate the course. This course and drift pointer 18 is connected by mechanism hereinafter described with the ground speed arm 19 in such a manner that both elements 18 and 19 move together during rotation of the arm 19 such that the angle through which the ground speed arm 19 is swung equals for all positions the angle through which the pointer 18 is swung. But longitudinal motion of the arm 19 up and down the instrument housing 10 does not in any way affect the position of the pointer 18, for it remains stationary during the longitudinal travel of the ground speed arm 19.

The foregoing description outlines in general the appearance of the face of the instrument and explains in a general way the function of the several indicating elements thereof, and a description of the mechanism will now be given.

As already stated, the compass card 12 and wind arm 14 may be fixed to the shaft 13 and rotated thereby. Since it is frequently required that the wind arm 14 be reset as to its position upon the compass card, means are employed for releasing the wind arm 14 from normal locked position with the compass card 12 thereby enabling the navigator to change the position of the arm in respect to the compass card; and to this end, the shaft 13 is made with a head 34 provided with a dove-tailed slot in which the wind arm 14 is slidably confined. A split wire ring 35 encircles the shaft head 34 underneath the wind arm 14 and the arm 14 presses the ring 35 against the face of the compass card 12 so firmly that the card and arm are positively held together. The index pin 15 projects through the wind arm on the underneath side thereof and acts as a stop to prevent the arm from dropping out of the head 34, and also the underneath pin end may pass through the split of the ring and come to rest in a slot 33 made in the head of the shaft so as to align the index pin 15 with the shaft axis 13.

The shaft 13 is journaled in a bushing 36 and the bushing is in turn journaled in the instrument housing 10 and adapted to rotate therein. A nut in the form of a worm wheel or gear 37 is screw-fastened to the shaft 13, and a worm pinion 38 engages the worm wheel 37. The worm 38 is made on the end of a shaft 39 on the outer end of which the aforementioned knob 30 is anchored and by which the navigator or instrument operator rotates the compass card 12 and wind arm 14.

When it becomes necessary to alter the relative fixed position of the compass card 12 and wind arm 14, the navigator grasps the wind arm with one hand and rotates the knob 30 by the other hand which forcibly unscrews the gear nut 37 from the shaft 13, the effect of which is to sufficiently relieve the pressure exerted on the split ring 35 to permit the wind arm 14 to be slid back and forth in the grooved head 34 as well as permit the compass card 12 to be rotated in relation to the wind arm. In this way, the navigator may quickly and conveniently reset the wind arm and compass card to bring about a new relation of parts when setting known values into the instrument for calculating various aerial navigation problems as they arise.

The movable course and drift index pointer 18 is pivotally mounted on the inner end of the shaft 13 but it does not move with the compass card and wind arm. It possesses independent movement but in the present disclosure it necessarily has an axis common with the compass card. The pointer 18 is interconnected with the ground speed arm 19 in such a way that both parts swing together through equal angles, and to this end the pointer 18 is made on the outer end of an arm 41 which swings in a concentric slot 42 in the instrument housing, and the inner end of the arm 41 is anchored to a spur gear 43. The spur gear 43 is mounted to freely rotate upon a reduced shaft end 44 integrally formed with the shaft 13, and a nut 45 holds the gear 43 in position and permits it to freely turn on the shaft 13 in order that the compass card 12 and pointer 18 be independently movable one of the other.

In order that the said movable course and index pointer 18 be operatably connected with the aforesaid ground speed arm 19, a two motion link in the form of a shaft 47 is employed to execute a novel mode of operation forming part of the invention; and this shaft has one end thereof slidably confined in a guide block 48 fastened to the housing while the other end of the shaft 47 is slidably confined in a movable guide sleeve 49 which is joined to or made a part of the slide block 23 as will be seen, and the sleeve 49 may move along or freely over the shaft 47. The shaft 47 is made with teeth rings 50 on one end thereof which engage the spur gear 43 already described; and it is to be noted that longitudinal motion of the shaft 47 will rotate the gear 43 and swing the index arm 41, but rotary motion of the said shaft 47 will not move this gear 43 in any respect. The other end of the shaft 47 is made with a worm 51 which is freely rotatable in the guide 49, and this worm 51 engages a gear wheel 52 anchored to the compound motion shaft 20. It is now observed how a swinging motion of the ground speed arm 19 is transmitted through the gear 52 and gear 43 to swing the course and drift pointer 18 around the drift scale 16 and compass scale 12 as well. The teeth rings 50 and worm 51 possess the same function as far as rotating both gears 52 and 43 are concerned when the shaft 47 is reciprocated, but the said teeth rings 50 and worm 51 of this shaft possess different functions in respect to the rotation of this shaft 47 as will be hereinafter described. The two motion link shaft 47 simply acts as a link in its longitudinal movement since its function is to pull but acts as a shaft to rotate through the gear 52.

Figure 4:
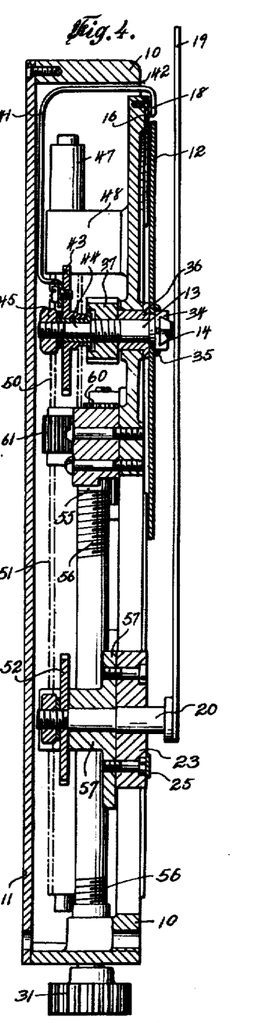
Figure 4 shows a central longitudinal view as taken on the line 4—4 of Figure 3.
Figure 5:
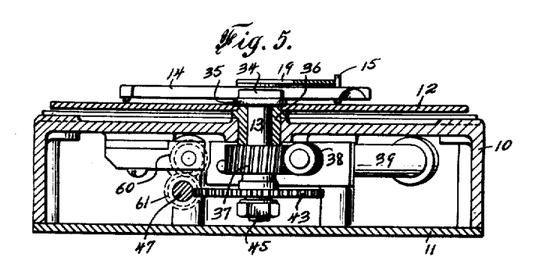
Figures 5, 6 and 7 illustrate respective cross sectional views taken on the respectively and similarly identified lines in Figure 3.

As already partly explained, the pointer 18 and arm 19 pivot together about their respective centers 13 and 20, but the arm 19 may be reciprocated in the guide 24 without causing movement of the pointer 18, and the mechanism for accomplishing this novel operating function will now be described. The knob 31 is anchored to a shaft 55 made with a lead screw 56 and this screw threads into or cooperates with a bearing block 57 which also forms the sleeve guide 49 anchored to the slide block 23 already described. As shown in Figure 4 the bearing block 57 is anchored by screws or other means to the slide block 23, and the combination slide bearing block 23—57 holds the shaft 20 during its combination rotary and longitudinal motion in respect to the instrument housing. The slide 23—57 is moved back and forth in the slot or guide 24 by rotating the knob 31 and the reciprocating motion of the shaft 20 with the gear 52 ordinarily would carry the shaft 47 through a similar longitudinal motion except for the fact that I interpose a compensating means for preventing the shaft 47 from being moved longitudinally in its supports 48 and 49 during rotating of the shaft 55.

Figure 6:
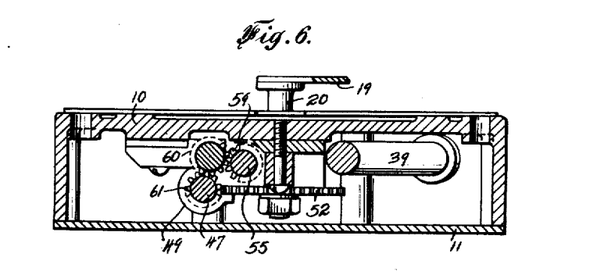
Figure 7:
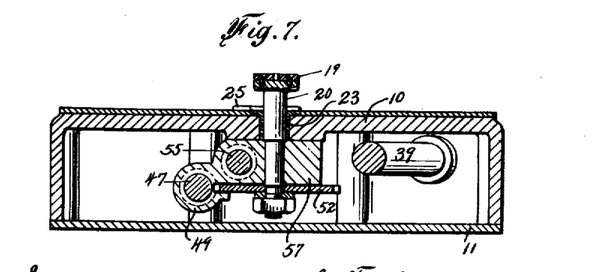
Figure 8:
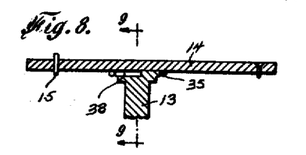
Figures 8 and 9 are fragmentary sectional views of the wind arm mounting, Figure 8 being a longitudinal view, and Figure 9 being a cross sectional view on the respective lines of the same numbers.
Figure 9:
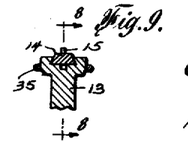

I accomplish, by the compensating means above mentioned, the longitudinal motion of the shaft 20 and gear 52 without resultant longitudinal motion of the shaft 47 during the rotation of the knob 31 and shaft 55 by anchoring a gear 59 to the inner end of the shaft 55 and meshing this gear with an idle gear 60, best seen in Figure 6, the said idle gear in turn meshing with a gear 61 anchored to the shaft 47. The gears 59 and 61 are the same size and therefore cause the shaft 47 to turn at the same speed and in the same direction with the shaft 55. Since the shaft 47 is rotated in the same direction and at the same speed as the shaft 55, there follows a compensating effect which prevents longitudinal motion of the shaft 47 for the reason that the worm 51 screws itself in reverse direction to that of the gear 52 at exactly the same speed thereof during rotary motion of the shaft 55, and as fast as the lead screw 56 advances in one direction carrying the gear 52, the worm 51 advances through the teeth of gear 52 in the other direction which permits the gear 52 to travel longitudinally but prevents it from turning and hence the index pointer 18 stands still.

In performing certain calculations, the compass card 12 is used by plotting or drawing lines thereupon as will be seen, and a pencil or scribing device is needed and I therefore may provide a pencil tube holder 63 sealed by a spring snap closure 64 in which a pencil is always conveniently available. It is to be understood that the instrument is of conveniently small size and portable. It may be installed on the instrument board of the craft or left unattached for the navigator finds it very handy for use before going aboard the craft as well as while in flight.

In coming to a description of the function and operation of the calculator, I will point out that the fixed axis 13, the movable axis or pin 15, and the longitudinally movable axis 20 constitute the three points of a triangle. The distance along one leg of the triangle from point 20 to 15 on scale 19 represents ground speed; the distance from point 15 to 13 on scale 14 represents wind velocity; and the length of the leg defined between the axis points 13 to 20 on scale 26 represents air speed.

Figure 1:
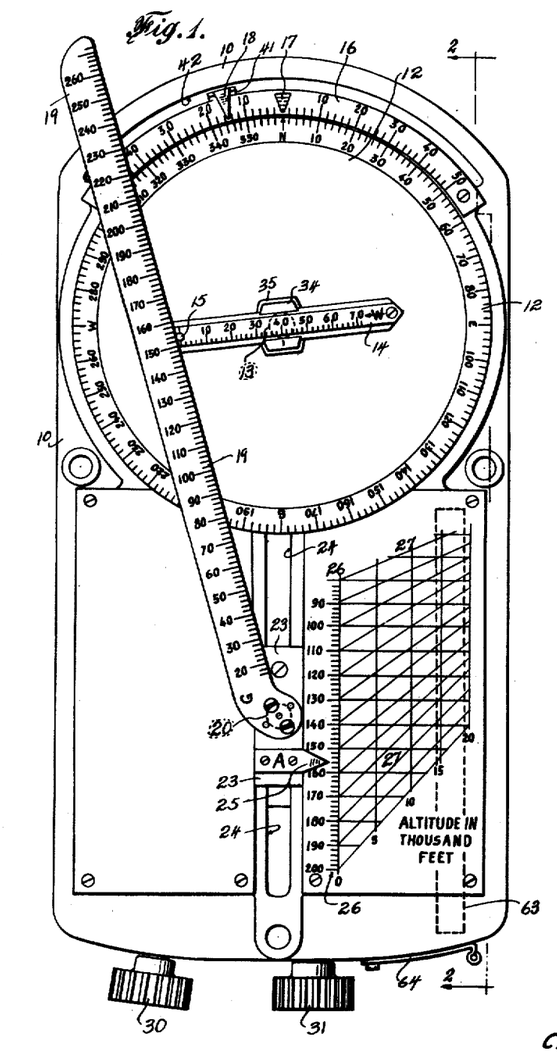
Figure 1 shows a face view of the navigation calculator.
Figure 2:
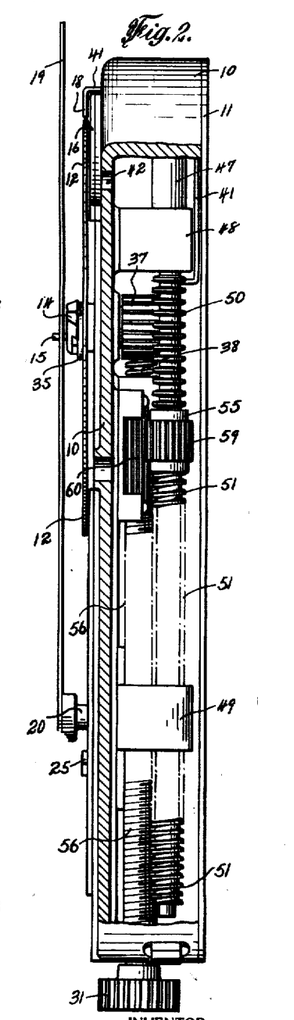
Figure 2 shows a side sectional view as developed on the line 2—2 of Figure 1.
Figure 3:
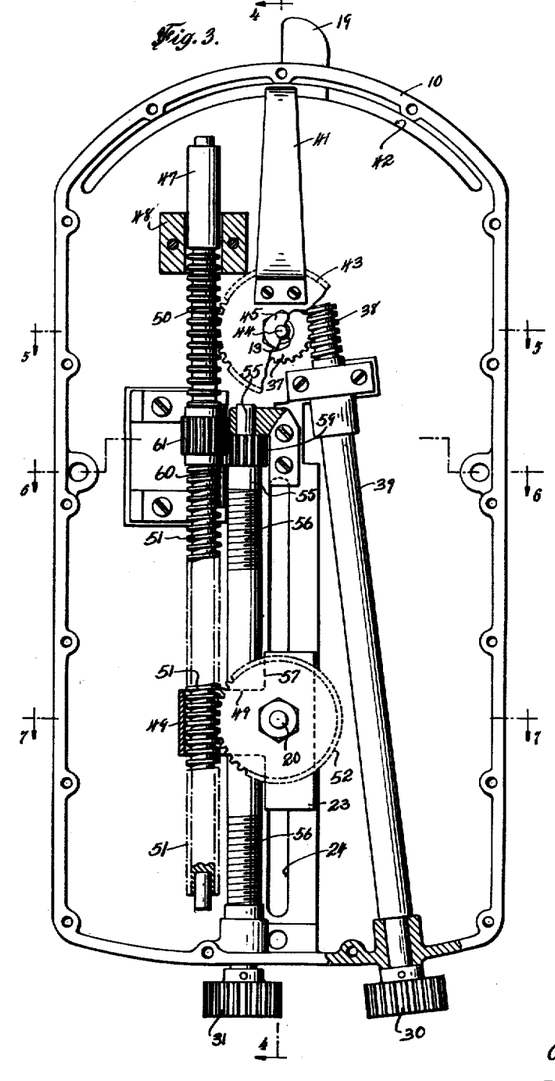
Figure 3 shows a rear view of the instrument with the cover plate removed exposing the operating mechanism.

Suppose, for example, that an airplane at M— is to make a straight flight to B—, in a direction 15 degrees west of north from M—, or in the direction 345 degrees on the compass. Suppose the wind to be 84 degrees east of north, as is indicated by the index W on arm 14 pointing to the compass scale 12 Figure 1, or blowing in a direction 264 degrees from north. Remember that a wind is commonly referred to by the direction from which it blows, but for navigational purposes it must be denoted by the direction to which it blows. Note that all directions are measured east, or clock-wise, from north. Suppose the anemometer at the field at M— shows the wind velocity as 40 miles per hour. Suppose the airplane to have a cruising speed of 156 miles per hour. The problem is to determine the direction in which the airplane must be headed to hold the proper course (345 degrees), and the speed over the ground which will be made good.

The above problem is solved as follows: Release the wind arm and compass card by holding the wind arm and rotating the knob 30. Set the ground speed arm for zero drift at the index 17 to give a radial reference line over the compass card. Set the wind arm to 40, as in Figure 1, the wind arm index being coincident with axis 13, and place the pin 15 against the ground speed arm 19, with the W arrow pointing up. Set the compass card to 264 opposite the fixed index 17. Lock the wind arm and compass card. The wind is now set into the instrument.

Now set the air speed index 25 at 156. Rotate the compass card by turning the knob 30, holding the ground speed arm 19 against the pin 15 until the course and drift index 18 points to the course as taken from a map (345 degrees) on the compass card. The proper heading will now be found at the heading index 17, which in this case is north or 0 degrees. The ground speed which will be made good under these conditions is indience line over the compass card. Set the the ground speed scale 19 : 153 miles per hour in this case. This is a typical example of the use of this calculator on the ground prior to a flight.

In the air the use of the navigation calculator varies according to the factors which are most easily determined. When flying over reasonably level country whose elevation is known, the ground speed can be easily determined by observation. For such a case the following problem is typical. The known factors are: air speed, 124 M. P. H.; drift angle, 12 degrees left; ground speed, 108 M. P. H.; heading, 88 degrees. To be determined: The above factors for a course of 284 degrees. This involves first the determination of the wind velocity and direction. The calculator is used as follows: The air speed and drift angle are set. The wind arm and compass card are released and the index pin 15 on the wind arm set at the ground speed (108) on the ground speed arm. The compass card is rotated to the heading, 88 degrees, and the wind arm and compass card locked by turning knob 30 as previously explained. The card is now rotated, holding the ground speed arm against the pin, until the drift index is opposite the new course, 284 degrees. The proper heading to be flown is now found at the heading index 17 to be 276 degrees, the drift angle 8 degrees to the right, and the ground speed 146½ M. P. H.

Figure 10:
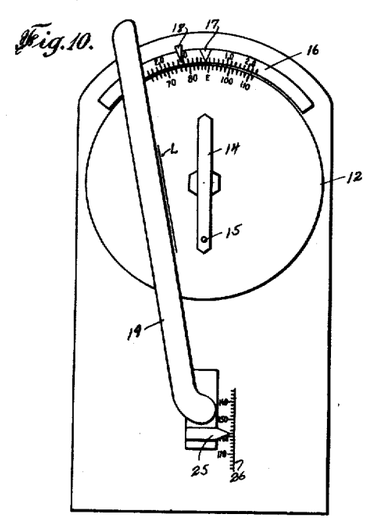
Figures 10, 11, 12 and 13 illustrate diagrams used in connection with the explanation of the function and use of the instrument.
Figure 11:
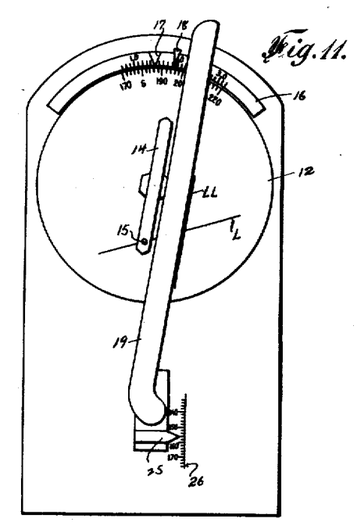
Figure 12:
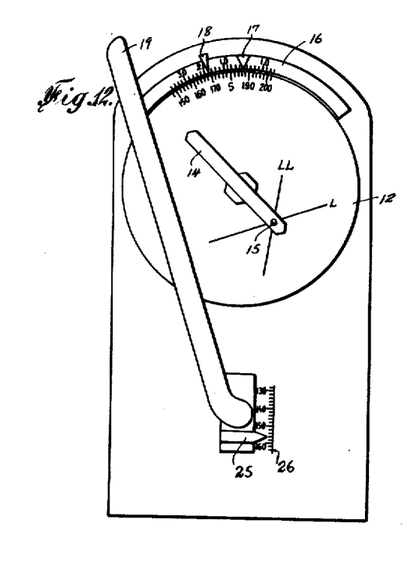
Figure 13:
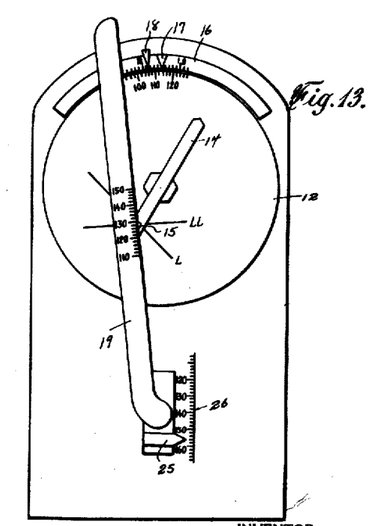

Dead reckoning navigation becomes somewhat more involved when flying over mountainous country or where the height of the aircraft above the ground is not known. Suppose, for example, that the known factors are: Air speed 158 M. P. H., heading 88 degrees, drift 11 degrees left. These are set into the calculator as in Figure 10 and a line L drawn on the compass card alongside the ground speed arm 19. The aircraft is now turned to any convenient heading, about at right angles to the previous one. Suppose the factors are now found to be as in Figure 11: air speed 156 M. P. H., heading 186 degrees, drift 9 degrees right. These are set into the instrument and a second line LL drawn on the compass card as before, as in Figure 11. The two pencil lines will be found to intersect, and the pin 15 of the wind arm is placed at this intersection, and the arm locked in place as in Figure 12. The direction and velocity of the wind have thus been set into the instrument. Now suppose the desired course, as indicated by the map, is 106 degrees. The compass card is rotated until the drift index 18 is opposite this course, 106 degrees as in Figure 13. For this course the proper heading is seen to be 114 degrees, at heading index 17 and a ground speed of 129 M. P. H. (read on arm 19) will be made good, assuming that the air speed is maintained at 156 M. P. H.

In addition to the above examples, the navigation calculator can be used for solving any problem which may be resolved into triangles, as well as those problems directly involving the factors with which the instrument is marked.

What I claim is:—

1. A calculating device, comprising in combination, a heading angle indicator, a course angle indicator, a drift angle indicator, a speed indicator for indicating speed in the direction of said heading angle, a speed indicator for indicating speed in the direction of said course angle, an indicator of the direction of a drift-causing force, and an indicator of the amount of said drift causing force, mounting means for operatively carrying said first, second, third, and sixth indicators on a common axis, and means provided to operate in conjunction one with the other the aforesaid indicators whereby said fourth, fifth and seventh indicators are indicated as the length of the three legs of a triangle.

2. A calculator comprising in combination, a heading index, a drift scale, a drift pointer movable across the drift scale, a compass card cooperating with the heading index, said pointer adapted to cooperate with the compass card to point out course, means for indicating ground speed, means for indicating wind velocity, and means for indicating air speed, the three means forming the graduated legs of a triangle, one leg of which is connected with the drift pointer and means to move the pointer and said one leg through equal angles.

3. A calculator comprising in combination, a heading index, said calculator provided with a drift scale, a drift pointer movable across the drift scale, a compass card cooperating with the heading index, said pointer adapted to cooperate with the compass card to point out course, a graduated ground speed arm, a ground speed index cooperating with the graduated arm, a graduated wind arm by which wind velocity is set into the instrument or for reading said wind velocity therefrom, air speed indicating means, a shaft, a clamp to fix the compass card and wind arm thereto, and a shaft and gear means whereby an operator may tighten and loosen the clamp.

4. A calculator, comprising in combination, a compass card, a heading index cooperable with said card, a drift scale concentric with said card, a course and drift pointer cooperable with said card and scale, an air speed scale, means cooperating with said air speed scale for conversion of indicated air speed to absolute air speed, an air speed index cooperable with said air speed scale, a ground speed arm and scale associated with said air speed index and slidable therewith, a ground speed index, and wind indicating means cooperable with said compass card and ground speed index.

5. A calculating device, comprising in combination, a compass card, a heading index pointing thereto, a drift scale concentric with said card, a pointer cooperating with said compass card to indicate course and with said drift scale to indicate drift, a wind indicating element carried above the compass card, a shaft projecting through the compass card and attached to the wind indicating element, clamp means to releasably anchor the element and compass card to the shaft, and a shaft and knob connected with the clamp means to tighten and loosen the latter and to turn the compass card and element.

6. A calculating device, comprising in combination, a compass card and a heading index pointing thereto, a drift scale concentric with said card, an index cooperating with said card to indicate course and cooperating with said scale to indicate drift, a wind indicating element carried with said card, said first-named index being fixed, said second-named index being movable, a pivotally mounted ground speed arm and scale and means connecting it with said element including means whereby the arm and movable index are caused to move through equal angles.

7. A calculating device, comprising in combination, a compass card, a heading index cooperating with said card, a drift scale concentric with said card, an index cooperating with said card to indicate course and cooperating with said scale to indicate drift, a wind indicating element cooperating with said card, means cooperable with the element for controlling said second-named index, mounting means adapted to movably retain the wind indicating element in operative position, and means arranged to lock the element and compass card together in fixed relation whereby the wind indicating element and compass may be set relative to each other and turned as a unit.

8. A calculating device, comprising in combination, a compass card, a heading index pointing to said card, a drift scale concentric with said card, a movable index cooperating with said card to indicate course and movably cooperating with said drift scale to indicate drift, a ground speed scale arm and means operatively connecting it to the movable index, a wind indicating element cooperating with said card, mounting means adapted to adjustably retain the wind indicating element in operative position, means arranged to lock the element and compass card together in fixed relation, and to unlock the same whereby the wind indicating element and compass may be set relative to each other and turned as a unit, and means for simultaneously rotating the compass card and wind element.

9. A calculating device, comprising in combination, an angle indicator, a second angle indicator, a third angle indicator, means for mounting said three angle indicators coaxially, an indicator of distance in the direction of the first angle, an indicator of distance in the direction of the second angle, an indicator of distance in the direction of the third angle, and said distances being indicated as the legs of a triangle.

10. A calculating instrument comprising in combination, indicating means in the form of a triangle the legs of which are graduated, a leg of the triangle being adapted to indicate ground speed, another leg thereof to indicate wind velocity, the third leg of the triangle arranged to indicate air speed, an index for and readable on each graduated leg and means to actuate each index, a compass card, a drift scale, a fixed index readable on the compass card to indicate heading, and a movable index to point to both compass card and drift scale to indicate course on the compass and indicate drift on the drift scale.

11. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass and indicate drift on the drift scale, and a connection established between the aforesaid ground speed indicating means and movable index whereby movement of one causes movement of the other through equal angles.

12. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass and indicate drift on the drift scale, a connection established between the aforesaid ground speed indicating means and movable index whereby movement of one causes movement of the other through equal angles, and means for imparting linear motion to the ground speed arm and for simultaneously holding stationary said movable index.

13. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass and indicate drift on the drift scale, a connection established between the aforesaid ground speed indicating means and movable index whereby movement of one causes movement of the other through equal angles, and a gear transmission adapted to impart linear movement to the ground speed arm and holding the movable index against angular motion due to said linear movement.

14. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass and indicate drift on the drift scale, a connection established between the aforesaid ground speed indicating means and movable index whereby movement of one causes movement of the other through equal angles, a gear transmission adapted to impart linear movement to the ground speed arm and means to hold stationary the movable index during the linear movement, and means associated with said third graduated leg for conversion of indicated air speed to absolute air speed and for indicating the latter on said third graduated leg.

15. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass and indicate drift on the drift scale, a connection established between the aforesaid ground speed indicating means and movable index whereby movement of one causes movement of the other through equal angles, a gear transmission adapted to impart linear movement to the ground speed arm and means to hold stationary the movable index during the linear movement, means associated with said third graduated leg for conversion of indicated air speed to absolute air speed and for indicating the latter on said third graduated leg, and a control device by which one of the aforesaid indices is moved along the air speed graduation.

16. A calculating instrument comprising in combination, indicating means in the form of a triangle the legs of which are graduated, a leg of the triangle being adapted to indicate ground speed, another leg thereof designed to indicate wind velocity, the third leg of the triangle arranged to indicate air speed, an index for and readable on each graduated leg, a compass card, a drift scale, a fixed index readable on the compass card to indicate heading, a movable index designed to point to both compass card and drift scale to indicate course on the compass card and indicate drift on the drift scale, a connection established between the aforesaid ground speed indicating means and movable index whereby movement of one causes movement of the other through equal angles, a gear transmission adapted to impart linear movement to the ground speed arm, means associated with said third graduated leg for conversion of indicated air speed to absolute air speed and for indicating the latter on said third graduated leg, and a control device by which one of the aforesaid indices is moved along the air speed graduation.

17. A navigation calculator, comprising in combination, a compass card, a drift scale concentric therewith, a heading index at the zero-point of said scale, a course and drift index cooperating with said card and scale, an air speed scale, a slider radially movable in relation to said compass card, an air speed index carrier upon said slider and cooperating with said air speed scale, a ground speed arm carried upon said slider and angularly movable in relation to said slider, a ground speed scale on said ground speed arm, a wind arm carried on said compass card and adjustable in relation thereto, an index on said wind arm cooperable with said ground speed scale, and means interposed between said ground speed arm and said course and drift index whereby the angle of said index in relation to said heading index equals the angle between said ground speed arm and a line connecting said compass card and said slider.

18. A device of the class described, comprising in combination, an axis, a second axis, manually operable means for moving said second axis rectilinearly toward or away from said first-named axis, an arm pivoted about said first-named axis, a second arm pivoted about said second axis, and means interconnecting said arms and said manually operable means whereby said first-named arm and said second arm are maintained parallel to each other regardless of the position of the second axis in respect to said first-named axis, a compass dial and wind arm pivoted about the first axis, operating means to rotate the compass dial and wind arm, and a clamp tightened and loosened by the operating means to engage and release the compass dial and arm.

19. A calculating instrument comprising in combination, a compass card, a shaft on which said compass card rotates, a wind arm mounted on said shaft, means for clamping the wind arm to the shaft and compass card, manually operable means for operating the clamping means and for rotating the compass card, a heading index adjacent the compass card, and means for indicating course, drift, ground speed, and air speed.

20. A calculating instrument comprising in combination, a compass card, a shaft on which said compass card rotates, a wind arm mounted on said shaft, means for clamping the wind arm to the shaft and compass card, manually operable means for loosening the clamping means and for rotating the compass card, a heading index adjacent the compass card, means for indicating air speed, two movable elements one of which has a ground speed scale, a drift scale cooperating with the other element, and a connection established by which the elements move parallel one to the other.

21. A calculating instrument comprising in combination, a compass card, a shaft on which said compass card rotates, a wind arm mounted on said shaft, means for clamping the wind arm to the shaft and compass card, manually operable means for operating the clamping means and for rotating the compass card, a heading index adjacent the compass card, a scale for indicating air speed, two movable elements one of which has a ground speed scale, a drift scale cooperating with the other element, a connection established by which the elements move parallel one to the other, additional manually operable means for imparting linear motion to the ground speed element, and an air speed index movable with the ground speed element along the air speed scale.

22. A calculating instrument comprising in combination, a compass card, a shaft on which said compass card rotates, a wind arm mounted on said shaft, means for clamping the wind arm to the shaft and compass card, manually operable means for operating the clamping means and for rotating the compass card, a heading index adjacent the compass card, a scale for indicating air speed, two movable elements one of which has a ground speed scale, a drift scale cooperating with the other element, a connection established by which the elements move parallel one to the other, additional manually operable means for imparting linear motion to the ground speed element, an air speed index movable with the ground speed element along the air speed scale, and mechanism cooperating with the manually operable means for restraining one of the movable elements against movement during the linear travel of the other, and means causing both elements to move in parallelism during angular movement of either element.

23. A calculating instrument comprising in combination, a casing, a compound motion shaft carried by the casing and adapted to rotate and undergo linear motion, another shaft rotatably carried in the casing, a graduated ground speed arm fixed on the compound motion shaft, a movable drift and course index arm journaled on the second named shaft, a drift scale and compass card cooperating with the movable index arm, means arranged to hold the index arm and ground speed arm parallel during motion thereof, a graduated wind velocity arm provided with an index cooperating with the ground speed arm, and air speed indicating means.

24. A calculating instrument comprising in combination, a casing, a compound motion shaft carried by the casing and adapted to rotate and undergo rectilinear motion, another shaft rotatably carried in the casing, a graduated ground speed arm fixed on the compound motion shaft, a movable drift and course index arm journaled on the second named shaft, a drift scale and compass card cooperating with the movable index arm, means arranged to hold the index arm and ground speed arm parallel during motion thereof, a graduated wind indicating arm provided with an index cooperating with the ground speed arm, air speed indicating means, a manually operable mechanism for rotating the compass card, and a manually operable device for imparting said rectilinear motion to said first-named shaft.

25. A calculating instrument comprising in combination, a casing, a compound motion shaft carried by the casing and adapted to rotate and undergo rectilinear motion, another shaft rotatably carried in the casing, a graduated ground speed arm fixed on the compound motion shaft, a drift and course index arm journaled on the second named shaft, a drift scale and compass card cooperating with the movable index arm, means arranged to hold the index and ground speed arm parallel during motion thereof, a graduated wind velocity arm provided with an index cooperating with the ground speed arm, air speed indicating means, a manually operable mechanism for rotating the compass card and wind arm, a manually operable device for imparting said rectilinear motion to first-named shaft, and means cooperating with the manually operable mechanism for locking and unlocking the wind arm in relation with the compass card whereby the wind indicating element and compass may be set relative to each other and turned as a unit.

26. A calculating instrument comprising in combination, a compass card and cooperating heading index, a drift scale and cooperating drift index, a wind arm carried above the compass card, a shaft on which the compass card and wind arm and drift index are mounted, said drift index being pivotally carried by said shaft, means for locking the card and wind arm together, a graduated ground speed arm pivoted at one end thereof and having the other end swingable across the compass card, an index on the wind arm cooperable with the ground speed arm, and an air speed indicating means.

27. A calculating instrument comprising in combination, a compass card and cooperating heading index, a drift scale and cooperating drift index, a wind arm carried above the compass card, a shaft on which the compass card and wind arm and drift index are mounted, said drift index being pivotally carried by said shaft, means for locking the card and wind arm together, a graduated ground speed arm pivoted at one end thereof and having the other end swingable across the compass card, an index on the wind arm cooperable with the ground speed arm, an air speed indicating means, means for imparting rectilinear motion to the ground speed arm, means for rotating the compass card, and connecting means causing the ground speed arm and drift index to swing through equal angles.

28. An instrument of the character described, comprising in combination, a shaft, a compass card pivotally carried thereon, one end of the shaft provided with a clamping means, a wind arm held by the clamping means which acts to lock the compass card and shaft together, a gear nut carried by the other end of the shaft and adapted to operate said clamping means, manually operable means arranged to turn the gear nut to rotate the compass card and to operate clamping means aforesaid, a ground speed arm and scale cooperating with the wind arm, a drift scale, a movable index cooperating with the drift scale, and air speed indicating means.

29. An instrument of the character described, comprising in combination, a shaft, a compass card pivotally carried thereon, one end of the shaft provided with a clamping means, a wind arm held by the clamping means which acts to lock the compass card and shaft together, a gear nut carried by the other end of the shaft and adapted to operate said clamping means, manually operable means arranged to turn the gear nut to rotate the compass card and to operate clamping means aforesaid, a ground speed arm and scale cooperating with the wind arm, a shaft adapted to linear and rotary motion to which is fixed the ground speed arm, a gear fixed on the linear and rotary motion shaft, a gear fixed on the first-named shaft, a worm and tooth shaft connection established between the two gears, means engaging the linear and rotary motion shaft to impart rectilinear motion to the ground speed arm without rotating the said gears, said worm and tooth shaft adapted to impart rotary motion to both gears when either of said gears is rotated, and air speed indicating means.

30. A calculating instrument, comprising a housing; a compass card, a wind arm, a combined drift and course pointer, a ground speed arm, and an air speed index all movably carried in exposed position on the housing; said instrument provided with an air speed scale along which the air speed index moves, and having a drift scale along which the drift pointer moves; said ground speed arm, wind arm, and air speed scale, each forming one leg of a triangle; mounting means for holding the two arms in movable relation with each other, said air speed index movable along the air speed scale to vary the length of the triangle leg defined thereby; a connection established between the ground speed arm and combined drift and course pointer confining these two parts to equal angular travel; a control means by which the operator revolves the compass card and wind arm; and additional control means by which the operator imparts rectilinear motion to the ground speed arm and to the air speed index.

31. A calculator embodying in combination three axes, two of which are movable, one of the movable axes being an index, and one axis being fixed, a wind arm carried on the fixed axis and supporting the movable index, a ground speed arm carried on the other movable axis and provided with a scale with which the movable index cooperates, means for imparting rectilinear motion to the ground speed arm and axis, means permitting adjustment of the movable index, a compass card carried by the fixed axis, means for rotating the compass card, said calculator provided with a drift scale and provided with an air speed scale, a drift and course pointer swingably carried on the fixed axis, and an air speed index adapted to move rectilinearly with the ground speed arm.

32. A calculator embodying in combination, three axes defining the three corners of a triangle, two of which are movable, and one being fixed, a ground speed index coincident with one of the movable axes, a wind arm carried on the fixed axis and supporting the ground speed index, a graduated ground speed arm carried on the other movable axis and with which the ground speed index cooperates, means permitting adjustment of the ground speed index, a compass card carried on the fixed axis, means for rotating the compass card, said calculator provided with a drift scale and provided with an air speed scale, a drift and course pointer swingably carried on the fixed axis, an air speed index adapted to move rectilinearly with the ground speed arm axis, a gear arranged to turn the compass card, means for driving said gear, a gear secured to the drift and course pointer, a shaft having ring teeth thereon meshing with the gear secured to the pointer, a gear fixed to the ground speed arm, a screw made on the shaft engaging the last-named gear, a lead screw manually driven to impart rectilinear motion to the ground speed arm, and an idler gear interposed between the lead screw and shaft to drive said shaft in the same direction and at the same speed as the lead screw thereby maintaining a connection between the two gears but preventing rotation of either of the gears by the rotation of said lead screw.

33. A calculating instrument embodying triangle solution means, graduated triangle legs onto and from which data is set into the instrument and taken therefrom, a rotatable shaft disposed at one corner of the triangle, a movable index disposed at another corner of the triangle, and a compound rotatable and linear motion shaft defining the last corner of the triangle, an adjustable graduated member carrying the movable index and adapted to shorten or lengthen one of the triangle legs, a graduated arm fixed to the compound motion shaft and to which the movable index points an said arm being pivotally mounted to permit aforesaid triangle leg shortening and lengthening function to be executed, a second index carried by the compound motion shaft, means for moving rectilinearly the compound motion shaft to vary the length of another graduated leg of the triangle and move the second named index therealong, a graduated dial carried by the rotatable shaft, said instrument provided with a graduated scale concentric with the dial, and provided with a fixed index at the zero reading of the scale and pointing to the dial, a swingable pointer traveling along the scale and rim of the dial, mechanism causing coincident angular motion of the graduated arm and pointer, and means imparting rectilinear motion to the graduated arm and holding the pointer stationary.

34. In a compound motion mechanism a casing, two gears having parallel axes, one of said gears being journaled for angular motion in respect to said casing, the second of said gears being journaled for angular motion in respect to said casing and means further adapted to move the second gear rectilinearly in respect to said casing, means for holding said second gear against angular movement during its rectilinear movement, said means comprising a lead screw, a slider-nut cooperating with said lead screw and on which said second gear is journaled, and a floating shaft, said first gear having straight teeth, said floating shaft having ring teeth on a portion of its length, said ring teeth meshing with the teeth of said first gear, said second gear having angular teeth, said floating shaft having a worm thread cut upon a portion of its length, said worm thread meshing with the teeth of said second gear, and gear means interposed between said lead screw and said floating shaft.

35. Transmission mechanism comprising, a two motion shaft including parallel ring teeth and a worm screw, a gear meshing with the ring teeth, a slide block and a second gear carried therewith and which second gear meshes with the worm screw, a compound motion shaft journaled in the slide block and fixed to the second gear, a lead screw threaded through the slide block, and a gear train by which the two motion shaft and the lead screw are operatively connected to turn in the same direction.

36. Transmission mechanism for indicators and the like comprising, a two motion shaft including parallel ring teeth and a worm screw, a gear meshing with the ring teeth and a movable index carried with the gear, a slide block and a second gear carried therewith and which second gear meshes with the worm screw, a compound motion shaft journaled in the slide block and fixed to the second gear and a graduated arm mounted on the compound motion shaft, a lead screw threaded through the slide block, and a gear train by which the two motion shaft and the lead screw are operatively connected to turn in the same direction.

37. A navigation calculator having related scales adapted to be set for one set of facts and thereafter adjusted to a known change of one or more facts for solving for the remaining unknowns due to said change, and a movable index pointing to a plurality of said scales and controlled by movement of another of said scales for indicating different facts simultaneously on said plurality of scales.

38. A calculator comprising a rotatable compass card, a wind arm carried above the compass card adjustable rotatably and longitudinally from the center of the card, means to secure the wind arm in adjusted position upon the compass card, the wind arm from its end to the center of the compass card forming one side of a triangle, a pivoted arm forming the second side of the triangle, a pivot for the arm movable radially of the compass card, the third side of the triangle being the distance between the center of the compass card and the pivot of the pivoted arm, one of the latter two sides of the triangle representing ground speed and the other air speed, a drift scale indicating the angle between the latter two sides of the triangle, and means on the pivoted arm for enabling a line to be drawn on the compass card to correspond to the side of the triangle formed by said pivoted arm on said card.

39. A calculator comprising a rotatable compass card, a wind arm carried above the compass card adjustable rotatably and longitudinally from the center of the card, means to secure the wind arm in adjusted position upon the compass card, the wind arm from its end to the center of the compass card forming one side of the triangle, a pivoted arm forming the second side of the triangle, a pivot for the arm movable radially of the compass card, the third side of the triangle being the distance between the center of the compass card and the pivot of the pivoted arm, one of the latter two sides of the triangle representing ground speed and the other air speed, a drift scale indicating the angle between the latter two sides of the triangle, and an edge of the pivoted arm forming a straight edge between the center of the pivot of the pivot arm and the end of the wind arm.

40. A calculator comprising a frame, a compass card rotatably mounted on a pivot in fixed position on the frame, a wind arm mounted over the compass card and adjustable rotatably and longitudinally from the center of the compass card, a pivoted ground speed arm, the ground speed arm and wind arm cooperating to form two sides of a triangle, the third side of the triangle being the distance between the pivot on the ground speed arm and the compass card pivot, a drift scale, means cooperating with the drift scale to indicate the angle between the ground speed and air speed sides of the triangle, and means on the ground speed arm for enabling a line to be drawn on the compass card to correspond to the side of the triangle formed by said arm on said card.

41. A calculator comprising a frame, a compass card rotatably mounted on a pivot in fixed position on the frame, a wind arm mounted over the compass card and adjustable rotatably and longitudinally from the center of the compass card, a pivoted ground speed arm, the ground speed arm and wind arm cooperating to form two sides of a triangle, the third side of the triangle being the distance between the pivot on the ground speed arm and the compass card pivot, a drift scale, means cooperating with the drift scale to indicate the angle between the ground speed and air speed sides of the triangle, and an edge of the ground speed arm forming a straight edge between the center of the pivot of the pivot arm and the end of the wind arm.

42. In an aerial navigation calculator, the combination of wind indicating means, ground speed indicating means, air speed indicating means, and means associated with said last-named means for conversion of indicated air speed to absolute air speed.

In testimony whereof I affix my signature.

CHARLES H. COLVIN.

CERTIFICATE OF CORRECTION.

Patent No. 1,910,093.                                     May 23, 1933.

CHARLES H. COLVIN.

It is hereby certified that error appears in the printed specification of the above numbered patent requiring correction as follows: Page 5, line 41, strike out the words "ence line over the compass card. Set the" and insert instead "cated by the position of the pin 15 against"; and that the said Letters Patent should be read with this correction therein that the same may conform to the record of the case in the Patent Office.

Signed and sealed this 22nd day of August, A. D. 1933.

(Seal)                                                M. J. Moore.
                                                      Acting Commissioner of Patents.